United States Patent [19]

Ringwood

[11] Patent Number: 5,106,393
[45] Date of Patent: Apr. 21, 1992

[54] DIAMOND COMPACT POSSESSING LOW ELECTRICAL RESISTIVITY

[75] Inventor: Alfred E. Ringwood, Redhill, Australia

[73] Assignee: Australian National University, Australian Capital Territory, Australia

[21] Appl. No.: 499,300
[22] PCT Filed: Jun. 27, 1989
[86] PCT No.: PCT/AU89/00273
§ 371 Date: May 15, 1990
§ 102(e) Date: May 15, 1990
[87] PCT Pub. No.: WO90/01986
PCT Pub. Date: Mar. 8, 1990

[30] Foreign Application Priority Data

Aug. 17, 1988 [AU] Australia ............... PI9885

[51] Int. Cl.$^5$ ........................... B24D 3/02
[52] U.S. Cl. ........................ 51/308; 51/293; 51/307; 51/309
[58] Field of Search ............. 51/293, 307, 308, 309

[56] References Cited

U.S. PATENT DOCUMENTS

| | | | |
|---|---|---|---|
| 4,142,869 | 3/1979 | Vereschagin et al. | 51/307 |
| 4,151,686 | 5/1979 | Lee et al. | 51/307 |
| 4,260,397 | 4/1981 | Bovenkerk | 51/293 |
| 4,311,490 | 1/1982 | Bovenkerk et al. | 51/293 |
| 4,534,773 | 8/1985 | Phaal et al. | 51/293 |
| 4,874,398 | 10/1989 | Ringwood | 51/293 |

Primary Examiner—William R. Dixon, Jr.
Assistant Examiner—Willie J. Thompson
Attorney, Agent, or Firm—Nixon & Vanderhye

[57] ABSTRACT

A diamond compact comprised of more than 60 volume percent and less than 90 volume percent of diamond crystals connected by a silicon carbide bond. The bond contains more than 500 parts per million of nitrogen and/or phosphorus and the compact possesses a low electrical resistivity of less than 0.2 ohm cm. The compact may be produced by a process in which the diamond crystals are intimately mixed with a bonding agent comprising silicon and the mixture is subjected within a confining space to a high temperature and pressure within the graphite stability field to cause silicon in the bonding agent to react extensively with carbon in the diamond crystals to form the silicon carbide bond. To produce the low electrical resistivity, a material containing nitrogen and/or phosphorus is introduced into the confining space prior to application of the high temperature and pressure conditions. In a modified process, the mixed diamond crystals and bonding agent are placed immediately adjacent to one or more bodies of silicon within the confining space prior to application of the high pressure and temperature conditions. In this process, the nitrogen and/or phosphorus containing material may be mixed with the diamond crystals and bonding agent and/or with one of the additional bodies of silicon prior to application of the high temperature and pressure conditions.

13 Claims, 1 Drawing Sheet

DIAMOND COMPACT POSSESSING LOW ELECTRICAL RESISTIVITY

TECHNICAL FIELD

This invention relates to diamond compacts for use in the cutting, turning, drilling and similar working of hard materials.

Many different kinds of diamond compacts and diamond composites have been described in the literature and their properties vary widely. Generally speaking, a diamond compact is understood to mean a polycrystalline body possessing substantial abrasiveness and hardness and low or negligible porosity, comprised of more than 50 percent by volume of diamond crystals, in which a large proportion of diamond-to-diamond contacts occur.

U.S. Pat. No. 4,151,686 (Lee et al.) discloses a method for producing a diamond compact comprising diamond particles bonded by silicon carbide. According to this process, a mass of polycrystalline diamond powder is placed in juxtaposition with a body of silicon. The diamond-silicon assembly is placed in a high pressure-high temperature apparatus and subjected to a pressure of about 55 kilobars. The diamond-silicon assembly is then heated to about 1200°–1500° C. whilst subjected to pressure. This causes the silicon to melt and to infiltrate the mass of diamond powder. The temperature and pressure are maintained for a sufficient time to cause most of the silicon to react with the diamond to form silicon carbide which forms a strong bond between the diamond crystals, thereby producing a compact typically containing about 80–90 volume percent of diamond particles and 10–20 volume percent of silicon carbide. The product may possess high strength and hardness. A commercial product "SYNDAX-3" (Tomlinson et al., Ind. Diamond Rev. 45,299–304, 1985) is produced according to this process and is marketed as a cutting element for rock drills.

In order to practically utilize compacts produced by the process of U.S. Pat. No. 4,151,686, it is necessary to shape them into desired forms. This is difficult because of the hardness of the diamond compacts. Currently, when these kinds of compacts are used in industry they are shaped by laser-cutting and drilling. This is a rather inflexible technique in its mode of operation and cannot readily make cuts deeper than 3 about mm into diamond compacts. It is also limited in the range of shapes which can be produced. Moreover, laser cutting damages the surfaces of the compacts, necessitating removal of the damaged layer by a diamond-lapping process which is relatively expensive.

A technique which is widely employed in the shaping, working and machining of hard materials is Electrical Discharge Machining (EDM) also known as "spark erosion" and "wire-cutting". This technique can cut, drill and shape samples with much larger dimensions than can be worked by laser-cutting and is much more versatile in the range of shapes it can produce. However, in order to machine materials successfully, they must possess a low electrical resistivity. The EDM techniques cannot be applied successfully to machine diamond compacts of the type produced according to U.S. Pat. No. 4,151,686 because of the relatively high electrical resistivity displayed by these samples - typically between 0.3 and 5.0 ohm cm.

A method for producing a compact consisting of diamond bonded by silicon carbide possessing improved abrasive properties as compared with the compact of U.S. Pat. No. 4,151,686 is described in our pending International Patent Application No. PCT/AU85/00201. The improvements include pre-mixing of silicon with diamond prior to hot-pressing, which is carried out at lower pressures using a pressure-temperature-time cycle which causes an extensive degree of plastic deformation of the diamond crystals. More specifically, there is disclosed a process for producing a diamond compact for cutting, turning, drilling, and otherwise working ultra-hard ceramics, carbides and rocks which comprises (i) intimately mixing a mass of particulate diamond crystals with a bonding agent comprising silicon in the proportions 60–95 volume percent of diamond to 40–5 volume percent of bonding agent; (ii) subjecting the mixture within a confining space to a temperature in the range of 1100°–1600° C. at a mean confining pressure in the range of 10 kbars to 40 kbars, said combination of mean confining pressure and temperature lying within the graphite stability field; and (iii) maintaining the temperature and pressure conditions of the mixture for a period greater than about 3 minutes to cause silicon in the bonding agent to react extensively with carbon in the diamond crystals to form an interstitial phase of silicon carbide having a melting point above 1600° C. providing a strong bond between the diamond crystals while inhibiting the formation of free graphite by retrogressive transformation from diamond, said period being sufficient to result in substantial plastic deformation of the diamond crystals whereby extensive face-to-face contact between the diamond crystals occurs and also to result in substantial chemical equilibrium between the bonding agent and the diamond crystals whereby there is produced a thermally stable diamond compact having a minimum melting point above 1600° C. and a compressive strength above 10 kbars at ambient temperature.

In a modification of this process as disclosed in our International Patent Application No. PCT/AU88/00058, the mixed diamond crystals and bonding agent are placed immediately adjacent to one or more bodies of silicon within the confining space prior to application of said temperature conditions so as to cause infiltration of silicon from said body or bodies into the interstitial spaces between the diamond crystals on application of said temperature and pressure conditions.

It was found unexpectedly that the electrical resistivities of the compacts formed by the process of the above International Patent Applications were substantially smaller than for most of the compacts produced according to U.S. Pat. No. 4,151,686. Compacts produced according to International Patent Applications PCT/AU85/00201 and PCT/AU88/00058 typically display electrical resistivities between 0.15 and 0.5 ohm cm. It was found that compacts possessing resistivities as low as 0.15 ohm cm could be machined by EDM methods; however the process was relatively slow. Compacts possessing resistivities around 0.5 ohm cm could not be machined by EDM methods at practically effective rates. It would be advantageous to reduce the resistivities of the above diamond compacts still further so that they would be readily amenable to working, shaping and machining by EDM methods.

The electrical resistivity of compacts produced by the above methods depends in a complex manner upon three principal factors:

(i) The resistivity of the major diamond component.
(ii) The resistivity of the minor silicon carbide component.
(iii) The proportions of the two components and their textural relationships including the relative areas of diamond-to-diamond contacts, of diamond-to-silicon carbide contacts and the degree of inter-connectedness of the silicon carbide bond, including the presence or absence of thin films of silicon carbide between the surfaces of immediately adjoining, plastically-deformed diamond crystals.

It is believed that the cause of the lower resistivity of the compacts produced according to the process of International Patent Application No. PCT/AU85/00201 as compared to that of U.S. Pat. No. 4,151,686 arises from the relatively high degree of plastic deformation within the diamond crystals which is achieved in the former process. This is accompanied by the formation of abundant crystalline defects which reduce the electrical resistivity of the diamonds to values which are smaller than those of the silicon carbide bond.

The present invention enables the production of diamond compacts with even further reduced electrical resistivity whereby it is possible to produce compacts which can readily be shaped, worked and drilled by EDM methods.

DISCLOSURE OF THE INVENTION

According to the invention there is provided a diamond compact comprised of more than 60 volume percent and less than 90 volume percent of diamond cemented by a silicon carbide bond, said bond containing more than 500 parts per million of nitrogen and/or phosphorus, said compact possessing an electrical resistivity smaller than 0.2 ohm cm.

Preferably, the electrical resistivity of the compact is less than 0.1 ohm cm and even more preferably less than 0.05 ohm cm.

The invention further provides a process for producing a diamond compact for cutting, turning, drilling, and otherwise working ultra-hard ceramics, carbides and rocks which comprises (i) intimately mixing a mass of particulate diamond crystals with a bonding agent comprising silicon in the proportions 60–95 volume percent of diamond to 40–5 volume percent of bonding agent; (ii) subjecting the mixture within a confining space to a temperature in the range of 1100°–1600° C. at a mean confining pressure in the range of 10 kbars to 40 kbars, said combination of mean confining pressure and temperature lying within the graphite stability field; and (iii) maintaining the temperature and pressure conditions of the mixture for a period greater than about 3 minutes to cause silicon in the bonding agent to react extensively with carbon in the diamond crystals to form an interstitial phase of silicon carbide having a melting point above 1600° C. providing a strong bond between the diamond crystals while inhibiting the formation of free graphite by retrogressive transformation from diamond, said period being sufficient to result in substantial plastic deformation of the diamond crystals whereby to produce abundant crystalline defects and face-to-face contact between the diamond crystals and also to result in substantial chemical equilibrium between the bonding agent and the diamond crystals whereby there is produced a thermally stable diamond compact having a minimum melting point above 1600° C. and a compressive strength above 10 kbars at ambient temperature wherein material containing nitrogen and/or phosphorus is introduced into the confining space prior to application of said temperature and pressure conditions whereby to cause said silicon carbide bond in the compact to contain more than 500 parts per million of nitrogen and/or phosphorus and the compact to possess an electrical resistivity smaller than 0.2 ohm cm.

Said nitrogen and/or phosphorus containing material may be mixed with the diamond crystals and bonding agent prior to the application of said temperature and pressure conditions.

In a modified process the mixed diamond crystals and bonding agent are placed immediately adjacent to one or more bodies of silicon within the confining space prior to application of said temperature conditions so as to cause infiltration of silicon from said body or bodies into the interstitial spaces between the diamond crystals on application of said temperature and pressure conditions, and said nitrogen and/or phosphorus containing material is mixed with the diamond crystals and bonding agent and/or with said one or more bodies of silicon prior to application of said temperature and pressure conditions.

BRIEF DESCRIPTION OF DRAWING

The accompanying drawing identified as FIG. 1 is a graph in which the times required to perform standard cutting tests on various diamond compact samples are plotted against the nitrogen contents of silicon carbide bonds in the samples, and provides an indication of the manner in which machinability can be improved by increasing nitrogen content in accordance with this invention.

BEST MODES OF CARRYING OUT THE INVENTION

Figure 1:
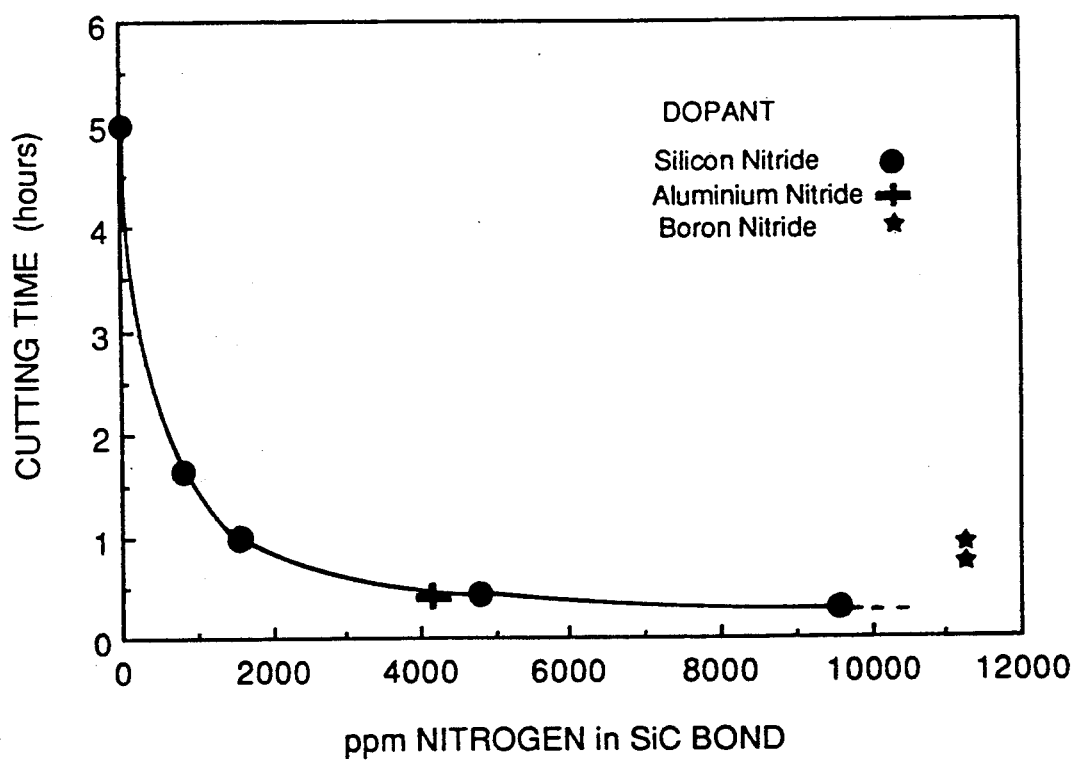

In practising the present invention, a compound or compounds containing nitrogen and/or phosphorus may be mixed with the silicon powder which is pre-mixed with the diamond powder as specified in International Patent Application No. PCT/AU85/00201. Alternatively, or in addition, a compound or compounds containing nitrogen and/or phosphorus is incorporated in a layer of silicon or silicon powder which is placed adjacent to the body of mixed diamond and silicon powder as specified in International Patent Application No. PCT/AU88/0058. The invention is then performed as described generally in International Patent Application No. PCT/AU88/00058 and specifically in Example 1 of that application. When performed in this way, the diamond compact produced by the invention is found to possess at least similar strength and abrasive properties to the diamond compact produced by International Patent Application No. PCT/AU88/00058, but in addition, displays an electrical resistivity generally within the range of 0.02 to 0.07 ohm cm. The silicon carbide bond of the compact contains at least 500 parts per million (ppm) nitrogen and/or 500 ppm of phosphorus. The compact thereby produced can readily be shaped, worked and drilled by EDM methods. In some embodiments of the present invention, the abrasive properties of the compact so produced may be superior to those not containing silicon nitride.

An alternative method of producing the nitrogenous silicon carbide bond is to employ types of diamonds which themselves contain substantial amounts of nitrogen in their crystalline structures. Most natural diamonds contain less than 2000 ppm of nitrogen and are generally unable to provide enough nitrogen to produce a sufficiently conductive silicon carbide bond. However, synthetic diamonds can be specifically prepared which contain sufficient nitrogen so that when they react with silicon to form the silicon carbide bond, the said silicon carbide bond contains more than 500 ppm nitrogen.

The nitrogen component which is mixed with the silicon may be in the form of a nitride. Silicon nitride, aluminium nitride and boron nitride have all been used successfully as additives and their effects are shown in FIG. 1. The preferred additive is silicon nitride powder, Si N. Aluminium and boron were also tried separately as additives but did not reduce the resistivity of the compact significantly. This demonstrates that nitrogen introduced is primarily responsible for the reduction in resistivity.

Phosphorus may be incorporated in the compact by mixing a minor amount of red phosphorus powder with the silicon. Alternatively, it may be added in the form of another phosphorus compound such as silicon phosphide or aluminum phosphide. As seen in Example 4, phosphorus is nearly as effective as nitrogen in lowering the resistivity of the diamond compact. Compacts thereby produced are readily shaped by EDM methods.

The relationship between the amount of nitrogen added to the compact and the ease of machining of the compact by EDM methods is shown in FIG. 1. When nitrogen is added as described above, it is incorporated within the silicon carbide bond between the diamonds. Hence the amount of nitrogen added is expressed in terms of its concentration within the silicon carbide bond. The nitrogen-doped diamond compacts were produced as described in Example 1 given later in this specification. The compacts consisted of solid cylinders with diameters of 11.5 mm. An AGIE Spark Erosion Machine (EMT10) operating in the wire-cutting mode was used to make cuts across the cylindrical surfaces perpendicular to the axis of the cylinder to a depth of 3 millimeters. The operating conditions of the EDM machine were kept constant for each sample. The time required to make the 3 mm cuts provides a measure of the "ease of machineability" of the sample. These cutting times are plotted against the nitrogen contents (in parts per million) of the silicon carbide bonds in FIG. 1.

The cutting time for a sample containing no added silicon nitride was 5 hours. The cutting time is seen to fall sharply as small amounts of silicon nitride are added and is reduced to 1.65 hours for a sample which contains 800 ppm nitrogen in the silicon carbide bond. The cutting time is further reduced to 1 hour with 1600 ppm nitrogen, 0.4 hours with 4800 ppm nitrogen and 0.3 hours with 9600 ppm nitrogen in the bond. There is no substantial decrease in the cutting time as the nitrogen content in the bond is increased up to 200,000 ppm. Thus, the addition of a minor amount of nitrogen as silicon nitride, reduced the standard cutting time of these compacts via EDM machining by more than a factor of 10. Compacts so prepared can be cut by EDM approximately as quickly as tungsten carbide.

It is also seen in FIG. 1 that when the nitrogen is added in the form of aluminium nitride or boron nitride powders, a 6-fold decrease in machining time is achieved. This improvement is nevertheless of sufficient magnitude to be of considerable practical significance. It has also been determined that the addition of phosphorus has an effect similar to that of boron nitride and aluminium nitride. Compacts produced with these additives can readily be shaped by EDM methods.

In a further embodiment of this invention, we have found that silicon nitride can be incorporated as a substantial or major component of the bond between diamond crystals, thereby producing a diamond compact possessing a resistivity of about 0.05 ohm cm and possessing outstanding hardness, strength and toughness, and excellent abrasive properties. In this embodiment, the bonding agent which is premixed with the diamond may itself consist of a mixture of silicon and of silicon nitride powders varying in composition from silicon (95) silicon nitride (5) to silicon (0) silicon nitride (100), the number signifying parts by weight. The combined proportions of silicon plus silicon nitride $(Si+Si_3N_4)$ to diamond in the mixture may range between 5–30 parts $(Si+Si_3N_4)$ to 95–70 parts of diamond particles. The mixture of bonding agents is placed adjacent to a mass of silicon and the invention is then carried out according to the method of International Patent Application No. PCT/AU88/00058 making use of a pressure capsule as illustrated in FIG. 1 of that application and as described more specifically in Example 1 of the application. During the performance of the invention, additional silicon from the external adjacent mass of silicon infiltrates into the compact. Nearly all of the free silicon reacts with diamond to form silicon carbide during the performance of the invention. Diamond compacts thereby produced are comprised of more than 50 percent by weight of diamond particles cemented by a bond consisting of a mixture of silicon carbide and silicon nitride in the proportions by weight $SiC(95)$—$Si_3N_4(5)$ to $SiC(50)$—$Si_3N_4(50)$. The electrical resistivity of the compacts is about 0.05 ohm cm for compacts with bonds containing from 5 to 30 percent $Si_3N_4$. Throughout this composition range the compacts can readily be shaped by EDM methods.

In a modification of this embodiment of the invention, the external body or bodies of silicon are replaced by mixtures of silicon and silicon nitride in the proportions given above. The invention is performed as described above and the compositions and properties of the resultant compacts are similar to the products as described above.

The practice of the invention is illustrated below by reference to the following Examples:

EXAMPLE 1

A mixture comprising 80 percent of 40–60 micron diamond powder and 20 percent of 4–8 micron diamond powder was prepared. This mixture was further intimately mixed with 1–5 micron silicon powder and minus 1 micron silicon nitride powder in proportions by weight comprising 90 percent diamond, 9.5 percent of silicon and 0.5 percent of silicon nitride. A cylindrical container of boron nitride with internal diameter of 12 mm and an internal height of 15.5 mm was prepared. A solid disc of silicon 0.5 mm thick with a diameter of 12 mm was placed across the base of the container. The diamond-silicon-silicon nitride mixture was then tamped into the container on top of the silicon disc. Finally, a second disc of silicon 1.0 mm thick was placed over the diamond-silicon mixture and the container closed with a disc of boron nitride. The capsule was then placed in a piston cylinder high temperature-high pressure apparatus of the type described by F. Boyd and J. England (J. Geophys. Res. 65,741, 1960). The internal diameter of the pressure vessel was 2.54 cm and the pressure medium used was talc. The capsule was placed with an axially located graphite tube which was heated to the desired temperature by a heavy electrical current.

A pressure of 2 kilobars was first applied to consolidate the components of the pressure cell. The temperature of the diamond-silicon-silicon nitride mixture was then increased to 1100° C. over a period of 5 minutes. This temperature was insufficient to melt the silicon or to cause appreciable graphitization of the diamonds. Pressure within the apparatus was then increased to 25 kilobars over a period of 5 minutes. After holding the temperature at 1100° C. for a further 5 minutes, temperature was increased to 1550° C. over a period of 2 minutes and held constant for 25 minutes.

After completion of the run, temperature and pressure were slowly reduced to ambient conditions over a period of 30 minutes. The sample capsule was then removed from the apparatus.

The powder mixture was found to have formed into a diamond compact which was recovered in the form of an intact cylinder. After removal of excess silicon adhering to the compact by dissolution in a mixture of concentrated nitric and hydrofluoric acids, the cylindrical compact was found to possess a diameter of 11.5 mm, a height of 10.5 mm and a density of 3.41 g/cm$^3$. The compact possessed excellent strength and hardness. When broken, the fractures were found to extend through the diamond crystals, showing the strength of the diamond-silicon carbide bond. X-ray diffraction analysis and measurements of polished surfaces showed that the compact consisted of diamond and silicon carbide, with minor silicon and graphite. The graphite content was less than 1 percent, and the silicon content was about 2 percent by weight. The amount of excess silicon which had been impregnated into the compact was determined gravimetrically as 8% by weight. Thus the compact contained 18% of total silicon, most of which was contained in silicon carbide which amounted to 23% by weight. These figures imply that the compact contained about 73 percent of diamond by volume, a figure which was confirmed by measurements of the surface area of diamond in photograph of a polished surface.

The compact possessed resistivity of 0.048 ohm cm and could readily be shaped by EDM. Tools cut from the cylinder were found to possess outstanding abrasiveness, hardness and compressive strength and displayed similar properties to the diamond compact in Example 1 of IPA No. PCT/AU88/00058.

EXAMPLE 2

As for Example 1, except that the silicon nitride powder was replaced by 0.3% of aluminium nitride powder. The electrical resistivity of the resultant compact was 0.09 ohm cm and it could be readily machined by EDM methods. It possessed similar mechanical properties to the compact of Example 1.

EXAMPLE 3

As for Example 1, except that the silicon nitride powder was replaced by 0.5% of boron nitride powder. The electrical resistivity of the resultant compact was 0.07 ohm cm and it could be readily machined by EDM methods. It possessed similar mechanical properties to the compact of Example 1.

EXAMPLE 4

As for Example 1 except that the silicon nitride powder was replaced by 0.5 percent of red phosphorus powder. The electrical resistivity of the resultant compact was 0.07 ohm cm and it could be readily machined by EDM methods. It possessed similar mechanical properties to the compact of Example 1.

EXAMPLE 5

As for Example 1 except that the diamond was mixed with bonding agents in the proportions by weight 90 percent diamond, 5 percent silicon and 5 percent silicon nitride. The resulting compact was comprised of about 70 percent of diamond bonded by a fine intergrowth of silicon nitride and silicon carbide in the approximate proportions SiC(80)—Si$_3$N$_4$(20). The compact possessed an electrical resistivity of 0.052 ohm cm and could readily be shaped by EDM methods. Tools cut from the compact possessed at least similar abrasiveness, hardness and compressive strength to the compact of Example 1. However they appeared to display significantly greater toughness than the compact of Example 1.

A shaped disc prepared according to the practice of this example was used to turn a cylinder of isostatically hot-pressed ESK silicon nitride. The sample displayed a wear-coefficient of 600 which is about twice as high as that of diamond compacts not containing silicon nitride but otherwise prepared similarly. A second disc prepared according to the practice of this example was used to turn a cylinder of Kennametal K68 tungsten carbide (6 percent cobalt). It displayed a wear coefficient of 60,000 as compared to 30,000 for a disc not containing silicon nitride, but otherwise prepared similarly. (The wear coefficient is defined as the ratio of the volume of stock removed from the samples being turned to the volume lost from the tool by wear). Only a small proportion of the nitrogen in these examples could have been present in solid solution within the crystal lattice of the silicon carbide bond. Most of the silicon nitride is believed to be present as small particles dispersed throughout the silicon carbide bond. These examples show that the presence of a substantial amount of silicon nitride incorporated in this manner within the silicon carbide bond produces a significant improvement in the capacity of these compacts to turn some ultrahard materials. It is believed that the dispersed silicon nitride particles may have the effect of toughening the silicon carbide matrix in which they are incorporated.

EXAMPLE 6

As for Example 1, except that 90 parts of diamond powder were mixed with 10 parts of silicon nitride powder. All of the silicon introduced was derived from the adjacent external discs of silicon. The resultant compact was comprised of about 75 percent of diamond bonded by a fine intergrowth consisting of approximately similar proportions of silicon nitride and silicon carbide. The compact possessed a resistivity of 0.14 ohm cm and could be machined by EDM methods, although not as readily as the compacts in the other examples. The compact displayed outstanding toughness, but was not quite as hard and abrasive as the compacts described in Examples 1 to 5.

EXAMPLE 7

As for Example 1, except that the diamond powder was mixed with bonding agents in the proportion 90 percent diamond, 5 percent silicon and 5 percent silicon nitride, whilst, in addition, the external silicon pads were replaced by masses of mixed powder consisting of equal proportions of silicon nitride and silicon. The resulting compact was composed of about 70 percent of diamond bonded by an intergrowth of silicon nitride and silicon carbide in the approximate proportions $SiC(65)-Si_3N_4 (35)$.

The compact possessed an electrical conductivity of 0.2 ohm cm and could be shaped by EDM methods, but not as readily as the samples in the other Examples. The compact displayed outstanding toughness but was not quite as hard and abrasive as the compacts described in Examples 1 to 5.

EXAMPLE 8

A compact was prepared using the impregnation method described be Lee et al in U.S. Pat. No. 4,151,686. A mixture of 2.33 grams of diamond grits comprising 65 parts of (mean particle size) 50 micron grits, 5 parts each of 25 and 15 micron grits, 15 parts of 6 micron grits and 10 parts of 2.5 micron grits as utilized in U.S. Pat. No. 4,151,686, 3(40-65) was prepared. The mixture was packed tightly into a cylindrical boron nitride sample container with a diameter of 12.5 mm and an internal height of 12 mm. A mixture amounting to 0.44 grams and comprising 95 percent of 1-5 micron silicon powder and 5 percent of minus 1 micron silicon nitride powder was placed in the sample container to form a layer in contact with the immediately underlying layer of mixed diamond grits.

The sample container and its contents, jacketed by pressure cell components were then placed in a high pressure-high temperature apparatus. In accordance with the teaching of U.S. Pat. No. 4,151,686, the full load pressure ws first applied to the sample and its temperature was then raised to 1500° C. at a rate of 600° C./minute and held at 1500° C. for 10 minutes. In the present example, a load pressure of 25 kilobars was employed. The heating was then discontinued and the pressure slowly reduced to ambient conditions.

The resulting specimen was a diamond compact bonded mainly by silicon carbide and possessing a thickness of 7.0 mm, a diameter of 11.5 mm and a density of 3.40 g/cm$^3$. The electrical resistivity of the sample was 5.2 ohm cm. The sample could not be cut by EDM methods, because of this high resistivity.

The example demonstrates that the electrical resistivity of a compact of this general class is not determined solely by the nitrogen content of the silicon carbide bond but depends also upon other factors including the method by which silicon is introduced into the mass of diamond grit and the pressure-temperature-time path which is utilized. The roles of these factors are described in our co-pending International Patent Applications Nos. PCT/AU85/00201 and PCT/AU88/00058. In the present example, it is believed that the method of silicon impregnation and the pressure-temperature-time path did not cause the diamond grits to experience the substantial degree of plastic deformation which is essential in order to reduce the resistivities of the diamond particles. The example demonstrates the lack of obviousness in producing a compact with a resistivity below 0.2 ohm cm by doping the silicon with nitrogen.

What is claimed is:

1. A diamond compact comprised of more than 60 volume percent and less than 90 volume percent of diamond crystals connected by a silicon carbide bond, said bond containing more than 500 parts per million of nitrogen and/or phosphorus, said compact possessing an electrical resistivity smaller than 0.2 ohm cm.

2. A diamond compact as claimed in claim 1, wherein the electrical resistivity of the compact is less than 0.1 ohm cm.

3. A diamond compact as claimed in claim 1, wherein the electrical resistivity of the compact is less than 0.05 ohm cm.

4. A diamond compact comprising of more than 60 volume percent and less than 90 volume percent of diamond crystals connected by a silicon carbide bond, wherein the diamond crystals have been plastically deformed so that they have abundant crystalline defects and form a closely packed rigid structure in which contacts between the diamond crystals occur over extended mating surfaces arising from plastic deformation of the diamond crystals during formation of the compact under pressure and temperature within the graphite stability field, the diamond crystals being bonded together by said silicon carbide bond formed by reaction of a bonding agent comprising silicon with carbon in the diamond crystals during the formation of the compact under said pressure and temperature conditions, the silicon carbide bond having a minimum melting point greater than 1600° C. in the presence of carbon and said compact possessing a compressive strength greater than 10 kbars, said bond containing more than 500 parts per million of nitrogen, phosphorous or both, said compact possessing an electrical resistivity smaller than 0.2 ohm cm.

5. A diamond compact as claimed in claim 4, wherein the silicon carbide of the bond is mixed with silicon nitride.

6. A diamond compact as claimed in claim 4, wherein the silicon carbide of the bond is mixed with boron nitride and/or aluminium nitride.

7. A process for producing a diamond compact for cutting, turning, drilling, and otherwise working ultra-hard ceramics, carbides and rocks which comprises (i) intimately mixing a mass of particulate diamond crystals with a bonding agent comprising silicon in the proportions 60-95 volume percent of diamond to 40-5 volume percent of bonding agent; (ii) subjecting the mixture within a confining space to a temperature in the range of 1100°-1600° C. at a mean confining pressure in the range of 10 kbars to 40 kbars, said combination of mean confining pressure and temperature lying within the graphite stability field; and (iii) maintaining the temperature and pressure conditions of the mixture for a period greater than about 3 minutes to cause silicon in the bonding agent to react extensively with carbon in the diamond crystals to form an interstitial phase of silicon carbide having a melting point above 1600° C. providing a strong bond between the diamond crystals while inhibiting the formation of free graphite by retrogressive transformation from diamond, said period being sufficient to result in substantial plastic deformation of the diamond crystals whereby to produce abundant crystalline defects and face-to-face contact between the diamond crystals, and also to result in substantial chemical equilibrium between the bonding agent and the diamond crystals whereby there is produced a thermally stable diamond compact having a minimum melting point above 1600° C. and a compressive strength above 10 kbars at ambient temperature wherein material containing nitrogen and/or phosphorus is introduced into the confining space prior to application of said temperature and pressure conditions whereby to cause said silicon carbide bond in the compact to contain more than 500 parts per million of nitrogen and/or phosphorus and the compact to possess an electrical resistivity smaller than 0.2 ohm cm.

8. A process according to claim 7, wherein an elevated temperature up to 1600° C. is applied to the intimate mixture prior to application of pressure in the range of above 10 kbars to 40 kbars to maximize the degree of plastic deformation of said diamond crystals and to minimize production of graphite by retrogressive transformation of diamond.

9. A process according to claim 7, wherein the applied pressure is in the range of 15 to 30 kbars and the applied temperature is in the range 1200° C. to 1600° C.

10. A process as claimed in claim 7, wherein said nitrogen and/or phosphorus containing material comprises silicon nitride, boron nitride or aluminium nitride.

11. A process as claimed in claim 7 wherein said nitrogen and/or phosphorus containing material comprises red phosphorus powder.

12. A process as claimed in claim 7 wherein said nitrogen and/or phosphorus containing material is mixed with the diamond crystals and bonding agent prior to application of said temperature and pressure conditions.

13. A process as claimed in claim 7, wherein the mixed diamond crystals and bonding agent are placed immediately adjacent to one or more bodies of silicon within the confining space prior to application of said temperature conditions so as to cause infiltration of silicon from said body or bodies into the interstitial spaces between the diamond crystals or application of said temperature and pressure conditions, and wherein said nitrogen and/or phosphorus containing material is mixed with the diamond crystals and bonding agent and/or with said one or more bodies of silicon prior to application of said temperature and pressure conditions.

* * * * *